United States Patent [19]
Goel

[11] Patent Number: 4,658,011

[45] Date of Patent: Apr. 14, 1987

[54] POLYMERIZATION OF OXAZOLINE USING ALKALI OR ALKALINE EARTH METAL COMPLEX CATALYST

[75] Inventor: Anil B. Goel, Worthington, Ohio

[73] Assignee: Ashland Oil, Inc., Ashland, Ky.

[21] Appl. No.: 765,634

[22] Filed: Aug. 15, 1985

[51] Int. Cl.$^4$ .............................................. C08G 73/06
[52] U.S. Cl. .................................... 528/409; 528/210; 528/403; 528/419
[58] Field of Search ........................ 528/409, 403, 210

[56] References Cited

U.S. PATENT DOCUMENTS 3,542,699  11/1970  Levy et al. ........................... 528/409
4,365,056  12/1982  Plassmann ........................... 528/403

*Primary Examiner*—Harold D. Anderson
*Attorney, Agent, or Firm*—John F. Jones

[57] ABSTRACT

A process for the polymerization of oxazolines and copolymerization of oxazolines with epoxy resins in the presence of catalytic amounts of cationic complexes of alkali metals and alkaline earth metals is disclosed.

9 Claims, No Drawings

POLYMERIZATION OF OXAZOLINE USING ALKALI OR ALKALINE EARTH METAL COMPLEX CATALYST

This invention relates to a process for the homopolymerization of mono- and bis-oxazolines in the presence of a catalyst comprising an alkali metal or an alkaline earth metal cationic complex.

Oxazolines have been known to undergo ring opening homopolymerization in the presence of catalysts such as Lewis acids, inorganic acids, and cationic catalysts such as boron trifluoride etherate, see *Chem. Revs.* 71, 483 (1971). It has also been shown by Kobayashi et al, *Makromol. Chem.*, 185, 441 (1984) that alkyl triflate or alkyl tosylate will catalyze the homopolymerization of oxazolines. The use of cationic complexes of alkali and alkaline earth metals as catalysts in the homopolymerization of oxazolines has not been disclosed in the prior art. The ring opening copolymerization of oxazolines and epoxy compounds using these catalysts also has not previously been disclosed.

I have discovered that oxazolines of Formula I and bis-oxazolines of Formula II will undergo ring opening homopolymerization in the presence of cationic complex catalysts of alkali and alkaline earth metals.

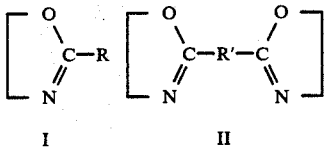

In Formula I R represents hydrogen, an alkyl group having from 1 to 20 carbon atoms, an aryl group having from 6 to 12 carbon atoms, an alkaryl group having from 7 to 20 carbon atoms, an alkyl ether group having from 1 to 20 carbon atoms or an aryl ether group having from 6 to 26 carbon atoms. In Formula II R' represents an alkylene group having from 1 to 20 carbon atoms, an arylene group having from 6 to 12 carbon atoms or an alkylene ether group having from 2 to 20 carbon atoms.

The catalysts embodied in the process of this invention include those conforming to the type $M(X)_n$ wherein M represents an alkali or an alkaline earth metal, X represents $BF_4$, $PF_6$, $BPh_4$, $ClO_4$, $AsF_6$ and $SbF_6$, and n represents 1 or 2 depending on the valence of M.

In the process of this invention mono-oxazolines polymerize rapidly in the presence of the catalyst to give solid thermoplastic polymers and the bis-oxazolines polymerize rapidly to give solid thermoset polymers, both types of polymers containing polyamide groups. Thus, when a mono-oxazoline, e.g., ethyl oxazoline, is mixed with about 2% by weight of lithium fluoborate and the mixture is heated at 110 degrees C., rapid polymerization occurs giving a solid polymer which contains a strong infrared band at 1620 cm−1 due to amide groups present. This reaction is illustrated in the following equation.

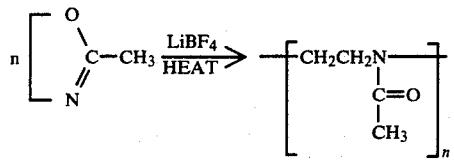

The process of this invention can also be applied to the copolymerization of oxazolines and epoxy resins. Epoxy resins which are useful in this invention can be monomeric or polymeric, saturated or unsaturated, aliphatic, cycloaliphatic, aromatic or heterocyclic, and they may be substitutes if desired with other substituents besides the epoxy groups, e.g., hydroxyl groups, ether radicals, halogen atoms, and the like. Typical epoxy components suitable if the practice of this invention include those disclosed in U.S. Pat. Nos. 2,500,600 and 2,374,483 which are incorporated here by reference. Preferred in this invention are 1,2-epoxy compounds having an epoxide equivalence greater than 1, that is to say, compounds containing more than one group of this formula

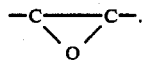

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic ring.

As epoxy compounds containing an inner 1,2-epoxy group there are suitable epoxidized diolefins, dienes, or cyclic dienes, such as 1,2,5,6-diepoxy hexane, 1,2,4,5-diepoxy cyclohexane, dicyclopentadiene diepoxide, dipentene diepoxide, and vinyl cyclohexene diepoxide, epoxidized diolefinically unsaturated carboxylic acid esters, such as methyl-9,10,12,13-diepoxy stearate, or the dimethyl ester of 6,7,10,11-diepoxyhexadecane-1,16-dicarboxylic acid. Furthermore, there may be mentioned epoxidized mono-, di-, or polyesters, mono-, di-, or poly acetals containing at least one cycloaliphatic 5-membered or 6-membered ring, to which at least two 1,2-epoxide groups are linked.

A widely used class of polyepoxides which can be used in the present invention are the epoxy polyethers obtained by reacting a halogen containing epoxide or dihalohydrin, such as epichlorohydrin, epibromohydrin, 3-chloro-1,2-epoxyoctane, and the like with either a polyhydric phenol or a polyhydric alcohol.

The process of this invention can be carried out with or without a solvent at a temperature in the range of from about 80 degrees C. to about 200 degrees C. at a pressure in the range of from about atmospheric to about 50 atmospheres.

The amounts of the cationic catalysts useful in the polymerization of oxazolines and in the copolymerization of oxazolines with epoxy resins may be in the range of 0.1 to about 5% by weight of catalyst based on the weight of the monomer or monomers. The polymerizations can be carried out by using either the solid catalyst which generally dissolves in the liquid oxazolines or solutions of catalyst in solvents such as alcohols, dialkyl ketones, linear and cyclic ethers and the like.

The process of this invention is further illustrated in the following representative examples.

EXAMPLE 1

Liquid benzyl oxazoline (Formula I wherein R is benzyl) (10 g) and 0.2 g of lithium fluoborate were mixed and heated at 120 degrees C. for one hour during which time the liquid benzyl oxazoline polymerized to give a solid polymer which was soluble in dimethyl formamide and N-methyl pyrrolidone. The Tg by DSC (Differential Scanning Calorimetry) for this polymer was found to be 69 degrees C. and 10% weight loss in nitrogen by TGA (Thermo Gravimetric Analysis) occurred at 358 degrees C.

EXAMPLE 2

A bis-oxazoline of Formula II in which R' is m-phenylene (6.5 g) was melted and maintained at 160 degrees C. and to this was added 0.10 g of lithium fluoborate which was dissolved in 0.3 ml of methanol and the resulting mixture was stirred rapidly. The gelation of the resulting mixture occurred within one minute to give a solid polymer which was found to be immiscible in dimethyl formamide and N-methyl pyrrolidone. The Tg for this polymer by DSC was found to be 81 degrees C. and 10% weight loss in nitrogen by TGA occurred at 374 degrees C. for the polymer.

EXAMPLE 3

A mixture of 2.5 g of an oxazoline of Formula I in which R is ethyl, 0.5 g of the bis-oxazoline described in Example 2 and 0.05 g of lithium fluoborate was prepared at room temperature and heated at 120 degrees C. for one hour during which time solid polymer formed. The Tg for the polymer by DSC was found to be 40.3 degrees C. and 10% weight loss in nitrogen by TGA occurred at 388 degrees C.

EXAMPLE 4

The procedure of Example 3 was followed using 2.5 g of the benzyl oxazoline of Example 1, 0.35 g of the bis-oxazoline of Example 2 and 0.05 g of lithium fluoborate. The resulting polymer was found to have a Tg of 64.1 degrees C. and 10% weight loss occurred at 355 degrees C.

EXAMPLE 5

To a mixture of 2 g of the bis-oxazoline described in Example 2 and 10 g of liquid diglycidyl ether of Bisphenol-A (epoxy equivalent weight of 190) was added 0.2 g of lithium fluoborate dissolved in 0.5 g of methanol. The methanol was stripped from the mixture and the resulting material was divided into two parts. One part was stored at room temperature and the other part was heated at 150 degrees C. The part stored at room temperature did not polymerize until about 5 hours standing, whereas, the heated mixture polymerized within about 15 minutes to give a solid polymer which was found to be insoluble in solvents such as dimethyl formamide, N-methyl pyrrolidone, and the like. The Tg of the polymer obtained by heating was found by DSC to be 65.2 degrees C. and 10% weight loss in nitrogen by TGA occurred at 355 degrees C.

I claim:

1. The process for the homopolymerization of an oxazoline comprising carrying out the homopolymerization at a temperature in the range of from about 80° C. to about 200° C. at a pressure in the range of from about atmospheric to about 50 atmospheres in the presence of a catalyst which is a cationic complex of an alkali or al alkaline earth metal.

2. The process of claim 1 wherein the oxazoline is one conforming to Formula I or II

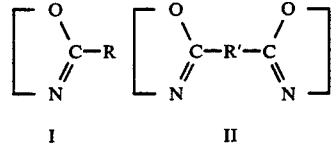

wherein R represents hydrogen, an alkyl group having from 1 to 20 carbon atoms, an aryl group having from 6 to 12 carbon atoms, an alkaryl group having from 7 to 20 carbon atoms, an alkyl ether group having from 1 to 20 carbon atoms or an aryl ether group having from 6 to 26 carbon atoms and R' represents an alkylene group having from 1 to 20 carbon atoms, an arylene group having from 6 to 12 carbon atoms or an alkylene ether group having from 2 to 20 carbon atoms.

3. The process of claim 2 wherein the catalyst is one of Formula $M(X)_n$ wherein M represents an alkali metal or an alkaline earth metal, X represents $BF_4$, $PF_6$, $BPh_4$, $ClO_4$, $AsF_6$ and $SbF_6$, and n represents 1 or 2 depending on the valence of M.

4. The process of claim 3 wherein the catalyst is present in from 0.1 to about 5% by weight based on the weight of the oxazoline.

5. The process of claim 4 wherein the oxazoline is one of Formula I in which R is benzyl and the catalyst is lithium fluoborate.

6. The process of claim 4 wherein the oxazoline is of Formula II in which R' is m-phenylene and the catalyst is lithium fluoborate.

7. The process of claim 4 wherein the oxazoline is a mixture of one of Formula I in which R is ethyl and one of Formula II in which R' is m-phenylene and the catalyst is lithium fluoborate.

8. The process of claim 4 wherein the oxazoline is a mixture of one of Formula I in which R is benzyl and one of Formula II in which R' is m-phenylene and the catalyst is lithium fluoborate.

9. The process of claim 4 wherein the oxazoline is one of Formula II wherein R' is m-phenylene and the catalyst is lithium fluoborate.

* * * * *